(12) United States Patent
Perez et al.

(10) Patent No.: US 10,523,325 B2
(45) Date of Patent: Dec. 31, 2019

(54) COMBINED EQUALIZER AND ATTENUATOR FOR REVERSE PATH OPTICAL NODES AND METHODS FOR MAKING AND USING SAME

(71) Applicant: Broadband International, Inc., Medley, FL (US)

(72) Inventors: Edward G. Perez, Homestead, FL (US); Edny Lynn Newsom, Buford, GA (US)

(73) Assignee: BROADBAND INTERNATIONAL, INC., Medley, FL (US)

( * ) Notice: Subject to any disclaimer, the term of this patent is extended or adjusted under 35 U.S.C. 154(b) by 0 days.

(21) Appl. No.: 15/979,541

(22) Filed: May 15, 2018

(65) Prior Publication Data

US 2018/0337730 A1 Nov. 22, 2018

Related U.S. Application Data

(60) Provisional application No. 62/508,014, filed on May 18, 2017.

(51) Int. Cl.
*H04B 10/50* (2013.01)
*H04B 10/2575* (2013.01)
(Continued)

(52) U.S. Cl.
CPC ....... *H04B 10/25751* (2013.01); *H04B 10/50* (2013.01); *H04B 10/6971* (2013.01);
(Continued)

(58) Field of Classification Search
CPC .... H04B 10/50; H04B 10/801; H04B 10/808; H04B 10/25751
See application file for complete search history.

(56) References Cited

U.S. PATENT DOCUMENTS 6,859,131 B2 2/2005 Stanek et al.
7,142,414 B2 11/2006 Lee et al.
(Continued)

OTHER PUBLICATIONS

Arris.com, "Opti Max Optical Node Series", OM6000, OM6000 Node_DS_14OCT16 (rev Oct. 2016) pp. 1-5.
(Continued)

*Primary Examiner* — Dzung D Tran
(74) *Attorney, Agent, or Firm* — Gregory L. Mayback; Dickinson Wright PLLC

(57) ABSTRACT

An optical node assembly for cable television communications comprises at least one optical receiver, at least one optical transmitter having a single first location shaped to receive a first JXP-style component, a router board, a forward configuration board connected to the optical receiver and the router board, a return configuration board connected to the optical transmitter and the router board, at least one RF module connected to the optical receiver and the optical transmitter through the router board and having a forward circuit path and a return circuit path having a single second location shaped to receive a second JXP-style component, and at least one JXP-style component having a circuit comprising both an attenuation sub-circuit and an equalization sub-circuit, the at least one JXP-style component being inserted in at least one of the single first location and the single second location.

20 Claims, 9 Drawing Sheets

(51) Int. Cl.
*H04N 7/22* (2006.01)
*H04B 10/69* (2013.01)
*H04B 10/80* (2013.01)

(52) U.S. Cl.
CPC ......... *H04B 10/801* (2013.01); *H04B 10/808* (2013.01); *H04N 7/22* (2013.01)

(56) References Cited

U.S. PATENT DOCUMENTS

| | | |
|---|---|---|
| 7,177,143 B1 | 2/2007 | Gomez |
| 8,077,474 B2 | 12/2011 | Perez et al. |
| 2004/0165857 A1 | 8/2004 | Xiao et al. |
| 2005/0170694 A1 | 8/2005 | Loeffelholz et al. |
| 2005/0246755 A1 | 11/2005 | Sandaluk et al. |
| 2006/0031911 A1 | 2/2006 | Shafer et al. |
| 2006/0279375 A1* | 12/2006 | Martine ............... H05K 3/301 333/81 A |
| 2008/0310128 A1 | 12/2008 | Blumenkranz |
| 2009/0219117 A1* | 9/2009 | Colussi ................ H04B 3/14 333/28 R |
| 2011/0033188 A1* | 2/2011 | Elbers .................. H04J 14/02 398/79 |
| 2012/0025800 A1 | 2/2012 | Dettloff et al. |
| 2015/0256215 A1* | 9/2015 | Hope ................... H04B 1/525 370/430 |
| 2016/0020820 A1 | 1/2016 | Hope |
| 2017/0279492 A1* | 9/2017 | Hope ...................... H04B 3/50 |

OTHER PUBLICATIONS

ATX, HFC Enhance. "Replacement EQs & Pads", Canada, Rev. Jan. 2016 (ANW0863), pp. 1-7.
ATX, Maxnet "RF & L-Band Signal Management", Canada, Rev. Nov. 2015 (ANW0592), pp. 1-2.
International Search Report and Written Opinion for Application No. PCT/US2018/032879 dated Jul. 27, 2018.

* cited by examiner

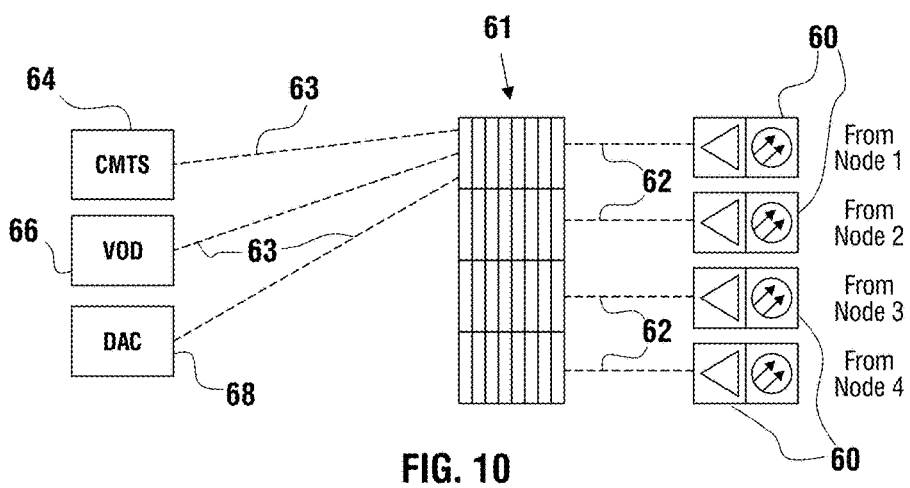
FIG. 10
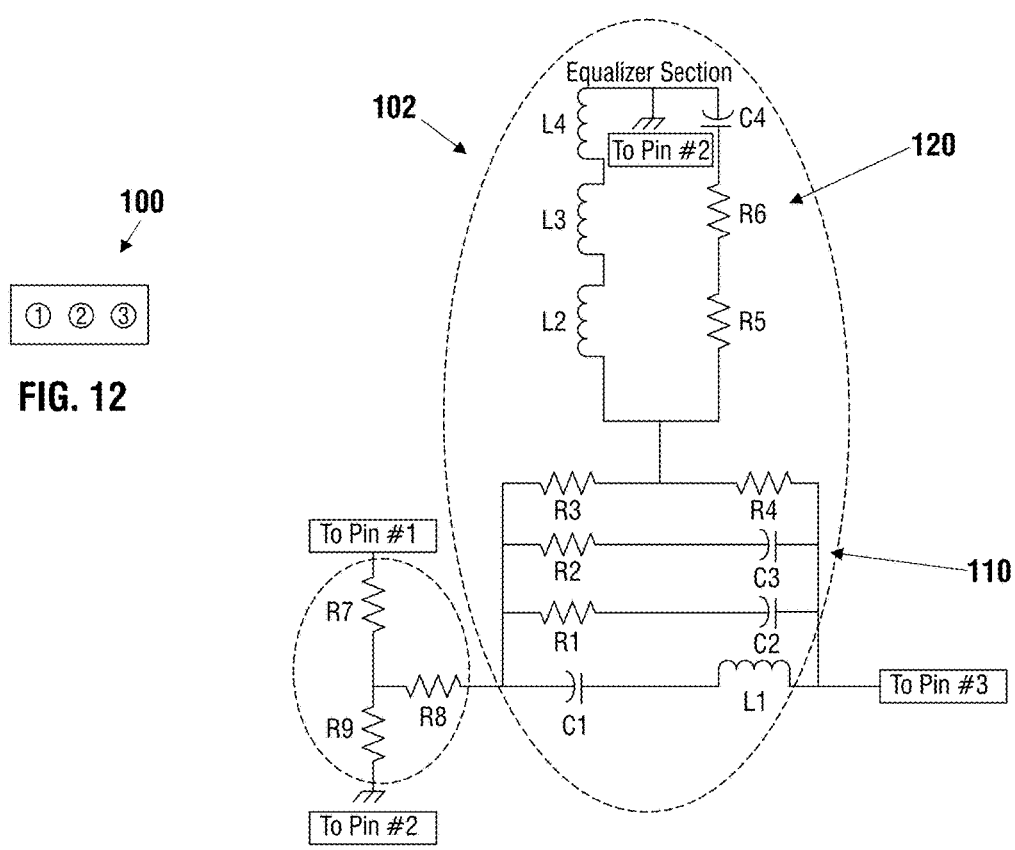
FIG. 12
FIG. 11

COMBINED EQUALIZER AND ATTENUATOR FOR REVERSE PATH OPTICAL NODES AND METHODS FOR MAKING AND USING SAME

CROSS-REFERENCE TO RELATED APPLICATIONS

This application claims the priority, under 35 U.S.C. § 119, of copending U.S. Provisional Patent Application No. 62/508,014, filed May 18, 2017, the prior application is herewith incorporated by reference herein in its entirety.

FIELD OF THE INVENTION

The present systems, apparatuses, and methods lie in the field of cable television communication systems. The present disclosure relates to a combined equalizer and attenuator for reverse path optical nodes and methods for making and using same. Also provided is a length-changing JXP-type combined equalizer and attenuator.

BACKGROUND OF THE INVENTION

Cable television (CATV) is a form of broadcasting that transmits programs to paying subscribers through a physical land-based infrastructure of coaxial cables or through a combination of fiber-optic and coaxial cables rather than through the airwaves. Thus, CATV networks provide a direct link from a transmission center, such as a headend, to a plurality of subscribers located at typically addressable remote locations, such as homes and businesses.

Cable television networks based on coaxial distribution have been deployed for over half a century. The main function for early cable systems was to provide television service to areas where off-the-air reception was unavailable. In the past thirty years, most cities and county locations have been wired for cable television services. These services have evolved from 2-12 local off-air channels in the 1950s and 1960s to a variety of current services over a signal distribution service transmitting FM radio broadcasts, multi-channel TV programs, pay-per-view-movies (Video on Demand), information services such as videotext, and the like. Many cable systems now originate their own programming in an ever-increasing number of channels. In recent years, novel services have been made available to the subscribers, including interactive services. One such service regards a two-way, interactive communication involving access to established data communication networks, such as the Internet. CATV transmission, however, has been designed mostly to optimize downstream broadcasting; it was not configured for upstream receipt of information from subscribers. Even though upstream transmission has existed for years, recent advances and customer requirements have increased the kind and amount of upstream transmission to such an extent that the infrastructure for transmitting that upstream information has issues needing to be corrected and/or improved.

The signals that are carried over the coaxial cable delivery system are typically received at a headend facility. A CATV headend is the central transmission center operative to gather and to provide complex audio, visual, and data media throughout a geographical area, which can cover most or all of a small city. In big cities or metropolitan areas, multiple headend facilities cover separate areas but can be interconnected redundantly for reliable supply of signals. The signals at the headend are received through, for example, satellite receive antennas, antennas erected on a tower, microwave links, fiber optic cables, and direct coaxial interconnects, and the external signals received through the various types of employed antennas include satellite, microwave, and local TV station broadcasts. Additionally, locally produced and pre-recorded programs can be introduced into the system. The responsibility of the headend is to process and to combine the received signals for distribution to customers and businesses. In addition, the headend assigns a channel frequency to all the signals destined for cable distribution. These single received signals are multiplexed into a group of channels that are spaced 6 MHz apart, which are then offered to the subscribers selectively or are bundled as packages. Pay-per-view and special pay channels are added by keying the subscribers' set-top boxes or by phone authorization from the subscribers. If an upstream channel is operative in the network, the option of electrical authorization can be provided to the subscribers.

Programming has increased from the local off-the-air channels to include local, regional, national, and international programming. More and more channels have been added over the years so that a typical cable system now might offer hundreds of channels with analog and digitally compressed services. Once the signals have been processed at the headend, they can be distributed to the coaxial system through fiber optic cables, microwave transmitters, or directly from the headend over the coaxial network.

A CATV system comprises a plurality of elements, which are operative in maintaining the flow of electrical data information through a coaxial conductor or through a combination of fiber-optic and coaxial cables to subscribers. The infrastructure of the system is required to span vast urban areas by cables installed underground or on high poles. It is routinely expected that the transmitted signals be kept at their highest possible fidelity having the lowest possible random energy interference level and this ability requires the CATV provider to periodically adjust the signals at each interconnect location.

Coupled between the headend and the subscriber end of the CATV system is a system of cables. A plurality of trunk cables, constructed of large diameter coaxial cables or of a combination of coaxial and fiber-optic cables, carry the signals from the headend to a series of distribution points. A typical cable system architecture includes a main trunk cable that is connected between the headend and these distribution points, referred to as hub stations or trunk/bridger stations. One or more feeder cables feed off the trunk/bridger station. Feeder cables branch out from the trunks and are responsible for serving local neighborhoods. Each feeder cable contains a number of taps disposed along the length of the feeder cable, and each tap contains a number of ports. A drop cable is connected between each port and a subscriber end and forms the familiar coaxial cables that enter directly into a CATV subscriber's premises. Terminal equipment is connected to the drop cable inside a CATV subscriber's home through a wall outlet. Among the more common terminal devices are televisions, VCRs, set-top boxes, converters, de-scramblers, cable modems, and splitters. For a system offering two-way communications, the subscriber end also has a terminal that transmits signals upstream, in the return path of the cable system.

FIG. 1 is a schematic drawing of a typical hybrid fiber/coaxial cable-based broadband/CATV telecommunications system. FIG. 1 can represent a typical cable television system that is currently deployed to service cable television subscribers. In the illustrative example shown in FIG. 1, forward CATV signals originate at a headend facility 1 and are supplied to a fiber optic transmitter 2. The fiber optic transmitter 2 transmits the forward CATV signals to a fiber optic node 4 over fiber optic cable 3 (shown with a dashed line). The fiber optic node 4 also transmits reverse path signals from the subscribers to an optical receiver of the headend 1. An optical receiver in or adjacent to the fiber optic transmitter 2 is not illustrated separately but is typically located in the headend 1 to receive and process these return path signals from the optical node 4. The optical node 4 processes the optical signal and can provide a standard RF output signal. The standard RF output signal is then provided to and carried over a coaxial cable 5 (a trunk or main line) to CATV trunk/network amplifiers 6 that are placed (in series) apart from one another with lengths of coaxial cable 5 therebetween. Depending upon the network architecture, the trunk/network amplifiers 6 can supply the signal to a network of distribution cables 9 that feeds signals to a smaller group of amplifiers, typically referred to as distribution or line-extender amplifiers 7. The distribution amplifiers 7 and distribution cable 9 feed passive devices placed near an end user's location to tap off a main signal supply, which devices are sometimes referred to as distribution or subscriber taps 8. The distribution taps 8 supply a signal tap for a subscriber's coaxial cable service drop 10. The subscriber service drop 10 enters a subscriber location 11 and provides the subscriber with desired services, such as television, high-speed Internet, and/or telephone.

It is noted that this embodiment is just one of many different types of CATV distribution architectures and many cable TV operators utilize different devices and equipment to deploy their services to the end subscriber. However, in many cases, systems that utilize coaxial cable to distribute their services deploy a similar architecture of fiber optic cable, coaxial cable, amplifiers, and passive distribution devices.

The signals transmitted from the headend to the subscriber end are contained within a particular frequency band—the forward (or downstream) path (or channel) of the CATV system. The signals transmitted from the subscriber end to the headend, or to some other upstream station, are transmitted in a different frequency band (higher and/or lower) than the forward path frequency band and these upstream transmissions are referred to as the return (or upstream) path (or channel) of the CATV system. When transmitted over fiber optic cables, losses in transmission are much improved and are more stable than when transmitted over coaxial cable. Accordingly, different techniques are required for improving transmission quality. The quality of transmission also is different with respect to the intermediate amplifiers used for fiber optic and coaxial cables.

Coaxial cables are constructed with a center conductor surrounded by a dielectric cross-section and an outer conductor, typically made from an aluminum outer shield. The coaxial cable attenuates the signal in a linear function of its conductor resistance. Different sizes of cable, therefore, attenuate the signal flow at different values due to the size of the center conductor and dielectric material. Booster amplifiers 6, 7 are placed along the coaxial cable. The spacing of the amplifiers 6, 7 along a cable route is determined by the loss of the route and is commonly selected based on the recommended operating gain of the amplifier 6, 7. Typically, the booster amplifiers 6, 7 are located at points where the signal levels have been reduced to a pre-designed level. These amplifiers 6, 7 are designed to add a minimum amount of noise and distortion to the processed signals. But, the amplifiers 6, 7 generate additional noise at various points in their circuitry. A ratio of total input noise power to a thermal noise floor is referred to as a noise figure of a given amplifier. As the amplifiers 6, 7 are not perfectly linear, they also contribute additional distortions each time a signal is amplified. Due to the inherent contributions of noise and distortion (e.g., nonlinearity), the signal can only be amplified a certain number of times before the change in the signal, as compared to the signal provided at the headend 1, becomes unacceptable. The cascade effects of the amplifiers 6, 7 (e.g., net distortion introduce into the signal) typically results in a limited number of amplifiers 6, 7 in a continuous cascade. The limiting factors may include the type of modulation, the total number of channels, and/or a desired performance at the end of the cascade. The Federal Communications Commission (FCC) has developed specific rules and regulations that govern the acceptable minimum performance to a cable customer. In particular, the FCC mandates that all signals provided over a cable system must maintain a peak to valley of less than or equal to less than 10 dBmV for systems of 300 MHz, plus 1 dB for each additional 100 MHz increments or fraction thereof. These rules and regulations must be taken into account during the design process of all cable systems.

One of the characteristics of coaxial cable is that the signal loss is less at lower frequencies (such as at channel 2, for example) than at higher frequencies (e.g., at channel 117). This phenomenon is shown, for example, in FIG. 2. Therefore, the amplifier 6, 7 needs less amplification at lower frequencies than at higher frequencies. One way of describing this correction is that the output of an amplifier 6, 7 is tilted to ensure minimal noise and distortion performance of the downstream signal flow. The output performance of the cable amplifier 6, 7 is typically reduced for the lower channels in relation to the higher channels based on the total number of channels carried on a cable system. The levels into the first gain block of most amplifiers are typically flat, which provides desirable performance. The overall signal levels for all channels must be maintained below a signal level that will not overload the input of a television or other signal reception devices. Because coaxial cable loses more signal as the frequency is increased, the levels of the lower frequencies must be reduced to provide equal power levels of all signals. The signal must be adjusted at the input of a given amplifier to reduce or "equalize" these signals, and circuits referred to as equalizers provide the correction for this transmission loss. The behavior of equalizers is shown in the graph of FIG. 3. The slope or tilt of the amplifier gain is adjusted by installing a fixed value equalizer. These equalizers typically have been available in 1 to 1.5 dB increments. To perform equalization at a particular amplifier 6, 7, a field technician selects proper values to balance that amplifier 6, 7 to a pre-designed output level, stated in dBmV. The result of applying an equalizer is shown in FIG. 4, in which the equalizer response pattern compliments the response pattern of the cable to produce a flat broadband output signal. The amplifiers 6, 7 also have a provision for adjusting forward and reverse gain levels. This is commonly accomplished by the installation of a fixed value attenuator, typically referred to as a "pad." The behavior of a pad is shown in the example of FIGS. 5 and 6 in which a signal (e.g., of 20 dBmV) is not attenuated in the graph of FIG. 5 and the signal is attenuated (e.g., by a 10 dB pad) in FIG. 6. The pads and equalizers might be installed before the input of the first gain hybrid or at interstage locations that are typically between two gain hybrids. Most legacy and state of the art amplifiers employ fixed cable equalizers. These are commonly plugged into the input or interstage location of the amplifier 6, 7 to reduce power levels of the lower channel.

FIG. 7 is a schematic drawing of a typical standard coaxial amplifier 6, 7 and application of equalizers and pads. Such amplifiers 6, 7 are typically placed at various locations along the trunk and distribution coaxial cables 5, 9. These amplifiers 6, 7 have specific purposes and are placed at pre-designed locations to amplify and equalize the forward and reverse signals. As those skilled in the art will readily understand, such amplifiers 6, 7 vary in design and in a number of output ports to feed different configurations of coaxial cables. Some models feed only one coaxial cable while other may feed many, for example, five different output cables.

FIG. 7 illustrates an example coaxial amplifier 6, 7 with three different forward output and reverse input cables. The forward signal 12 is received through the input coaxial cable 5, 9 and is routed to a RF/AC splitting device 13. In addition, an AC voltage typically supplies an internal power supply, where the AC voltage is converted to a DC voltage to power the amplifier. A bi-directional test point 14 provides the technician a port location to measure the forward input levels (and the reverse output levels as described below). In the example of FIG. 7, an RF portion of the signal is routed to a diplex filter 15. The diplex filter 15 separates and/or combines the forward signals of the cable system. A forward portion of the diplexer 15 is connected to the forward path of the amplifier for amplification. The forward signal flow is routed to an input equalizer 16 and an input pad 17. The input equalizer 16 and the input pad 17 condition the signal to supply a flat input to a first hybrid 18 in the amplifier 6, 7. The input hybrid 18 amplifies the signal by a pre-determined amount. The signal is then processed by another stage, including an interstage equalizer 19 and an interstage pad 20. The interstage equalizer 19 and pad 20 provide a tilted input to a third hybrid 21 in the amplifier 6, 7. This tilted level maximizes performance of the amplifier 6, 7 by reducing distortions and increasing the Signal-to-Noise ratio contributions of each amplifier (there are a total of three third hybrids 21 off the three-way splitter A in this amplifier 6, 7 to form three output ports). In each output channel, the output of the third hybrid 21 is routed to another diplex filter 22, which separates and or combines the forward and reverse path signals for their separate route through the amplifier and cable system. A bi-directional test point 23 provides the technician with a port location to measure the forward output levels (or the reverse input levels). The forward RF signal is, then, combined with the AC voltage at an AC/RF combiner 24 for signal to flow to the output coaxial cable 25 (which can be another coaxial cable 5 or 9 or it can be the subscriber service drop 10).

The reverse path has similar characteristics as the forward path where the coaxial cable exhibits less signal loss at lower frequencies (such as at 5 MHz, for example) than at higher frequencies (42 MHz, for example). The input as measured at the bi-directional test point 23 is balanced to arrive flat into the amplifier to ensure minimal noise and distortion performance of the upstream signal flow. The output performance of the reverse path cable amplifier is typically reduced for the lower frequency in relation to the higher frequencies of the reverse path (typically 30, 40, 42, 55, 65, 85, or 204 MHz). The RF levels into the reverse gain block of most amplifiers are typically flat, which provides desirable performance. The overall signal levels for all frequencies must be maintained at signal levels that will not overload or under drive the reverse hybrid or reverse amplifier. Because coaxial cable loses more signal as the frequency is increased, the levels of the lower frequencies must be reduced to provide equal power levels of all signals. Most amplifiers only have one equalizer location to equalize for the upstream coaxial cable losses. The equalizer is typically installed at the output location of the reverse amplifier to reduce power levels of the lower channel to the upstream amplifier input signal levels.

The reverse signal is received through the coaxial cable 25 and is routed to a RF/AC splitting device 24. In addition, an AC voltage typically supplies an internal power supply, where the AC voltage is converted to a DC voltage to power the amplifier. A bi-directional test point 23 provides the technician a port location to measure the reverse levels. In the example of FIG. 7, an RF portion of the signal is routed to the diplex filter 22. The diplex filter 22 separates and/or combines the forward and reverse signals of the cable system. A reverse portion of the diplex filter 22 connects to the reverse input pad location 20' on each port. Each port may be padded differently if the design requires different padding levels. These signals are then combined with the additional reverse signals from the two additional ports with a three-way combiner B. The combined reverse signals are then amplified by the reverse hybrid 18' by a pre-determined amount. The reverse signal is then adjusted with the correct output equalizer 16' and output pad 17' to ensure correct balanced levels. The reverse signals are then combined with the forward frequencies at the diplex filter 15 and combined with the AC voltage at an AC/RF combiner 13 for an output signal 12' to transmit on coaxial cable 5, 9. The bi-directional test point 14 provides the technician with a port location to measure the reverse output levels. The tilted reverse output levels maximize performance of the upstream amplifier by reducing distortions and increasing the signal-to-noise ratio contributions of each amplifier. This ensures a flat signal level across the reverse spectrum to the input of the upstream amplifier.

As the characteristics of coaxial cables and amplifier amplification characteristics vary with temperature changes, equalizer values may need to be changed several times over the course of a yearly time span to reflect the seasonal temperature changes. Each time the equalizer is changed, the cable television signal flow is interrupted while the correct value equalizer is exchanged. (For example, changing the fixed-value equalizer circuits commonly results in a 1-2 minute outage.) The majority of current cable television-based equalizer components are fixed-value plug-in equalizers that are placed in the forward and reverse signal path to equalize the signals on the cable network. One standard configuration for the plug-in equalizers 16, 16', 19, 26, 29 and the plug-in pads 17, 17', 20, 20', 27, 30, 40 is a JXP series plug-in, one of which in the form of a pad 40 is shown in the forward path of optical transmitters 47 and the reverse path of the optical receivers 49 of the optical node 4 of FIG. 9, this optical node 4 being an Opti Max™ OM6000 HFS modular optical node made by Arris.

Fiber optic cable does not have the same shortcomings of coaxial cable. In particular, coaxial cable attenuates the signal in a linear function of its conductor resistance but fiber optic cable does not. Thus, not only can fiber optic cable be laid in much longer lengths from the headend directly to optical nodes (an optical node converts the optical light signal to a standard output signal suitable for a coaxial distribution network) and between and among optical nodes within an optical network (typically configured in a loop to permit transmission from both directions if one optical node fails), equalization between these lengths of fiber optic cable is not needed because fiber optic cable delivers a flat response signal. This results in a transmission circuit where most of the over-land transmission occurs through fiber optic cable with coaxial cable being used primarily only at the subscriber's local area and at the drop to the subscriber's house/business.

Introduction of fiber optic cable has eliminated many of the long coaxial cascades and microwave systems deployed in the 1980's and 1990's. The fiber optic system allows the cable operator to route fiber optic cables closer to a group of customers and supply near headend quality performance at an optical node. The coaxial network then delivers the signal to a customer's home where the customer can receive the transmitted signals with a television receiver, set-top converter box, computer system, and/or telephone receiver.

An optical node typically supplies the broadband communications signal to a group of amplifiers that are capable of amplifying the forward and reverse path signals. A normal format for the signals, for example, is from 54-1000 MHz in the forward path direction and 0-42 MHz in the reverse path direction. Not all coaxial based systems operate at this frequency but most bi-directional systems operate a multi-path concept and can use different forward and reverse bandwidths. These frequencies include but are not limited to 0-40/52-1000 MHz (forward/reverse), 0-42/54-1000 MHz, 0-55/70-1000 MHz, 0-65/85-1000, 0-85/105-1000 MHz, and 0-204/258-1000 MHz. An example of an optical node 4 (in circuit diagram form) with a reverse input pad on each RF port and a single optical pad on the upstream transmitter is shown in FIG. 8 and a picture of an exemplary optical node is shown in FIG. 9. As those skilled in the art will readily understand, such optical nodes 4 vary in design and the number of output ports to feed different configurations of coaxial cables. Some models feed only one coaxial cable 5 while other may feed many, for example, five different output cables 5. The configuration of FIG. 8 illustrates an example of an optical node 4 that feeds output signals 35 to three different output coaxial cables 5. The picture of the exemplary configuration optical node 4 in FIG. 9 feeds four different optical cables. The optical node 4 contains a forward configuration board 41 and a return configuration board 43, each connected to a router board 45. Four fiber receivers 47 and four fiber return transmitters 49 are connected to router board 45. As is typical for virtually all optical nodes 4 on the market presently, each of the receivers 47 and transmitters 49 has a single location for inserting a JXP-style pad 40—in other words, for the transmitters 49, there is no location for an equalizer in the return path and, more particularly, there is no slot present in which an equalizer can be inserted in the return path. A status monitor device is also present at the optical connection side of the optical node 4 (at the bottom of FIG. 9). At the RF connection side of the optical node 4 (the top of FIG. 9), there is an RF module 50 for each of the four cable connections. This RF module 50 has a circuit diagram similar to one of the RF branches of the optical node 4 in FIG. 8. Accordingly, each RF module 50 has two locations in the forward path for inserting a JXP-style pad 17 and a JXP-style equalizer 16. Also, each RF module 50 only has a single location for inserting a JXP-style pad 40—in other words, there is no location for an equalizer in the return path. A power supply 52 and a power distribution board 54 are also present at the RF connection side.

With regard to the FIG. 8 circuit diagram, the forward signal 12 is received via the input fiber optic cable 3 and is routed to an input equalizer 26 and an input pad 27. The input equalizer 26 and the input pad 27 condition the signal to supply a flat input to an input hybrid 28 in the optical node 4. The input hybrid 28 amplifies the signal by a pre-determined amount. The signal is then processed by another stage, including an interstage equalizer 29 and an interstage pad 30. The interstage equalizer 29 and pad 30 provide a tilted input to the third hybrid 31 in the optical node 4. This tilted level maximizes performance of the optical node 4 by reducing distortions and increasing the Signal-to-Noise ratio contributions of each amplifier 31 (and the two other third hybrids 31 off the three-way splitter B). The output of the third hybrid 31 is routed to a diplex filter 32, which separates and or combines the forward and reverse path signals for their separate route through the downstream amplifier and then to the coaxial cable system. A bi-directional test point 33 provides the technician with a port location to measure the forward output levels or the reverse input levels. The forward RF signal is combined with the AC voltage at an AC/RF combiner 34 for signal 35 to flow to the output coaxial cable (which can be coaxial cable 5).

The input reverse signal 35 is received via the coaxial inputs 5. The reverse RF signal is then separated with the AC voltage at the AC/RF combiner 34. The bi-directional test point 33 provides the technician with a port location to measure the reverse input levels. The diplex filter 32 separates and or combines the forward and reverse path signals for their separate route through the node. The three separate reverse signals are routed to respective input reverse pads 40 for attenuation. The signals are combined with a three-way combiner C before amplification. The reverse hybrid 28' amplifies the signal by a pre-determined amount. The signal is then routed to the reverse optical transmitter 42. Most optical transmitters 42 have a location to install an attenuation pad 40 to ensure the correct drive levels to the optical transmitter input. However, the vast majority of optical nodes do not have an additional location for equalization in the reverse path at the optical node.

Cable operating companies are now offering to their subscribers advanced communication services in the return path, including addressable converter operation, pay-per-view transactions, telephony, interactive digital networks, and computer data transmission. To offer such services in a reliable manner, certain problems in the return path must be addressed. For instance, many CATV cable systems are designed primarily for forward path operation. The loss (or attenuation) values of each tap are selected to provide proper signal levels at the drop cables at forward path frequencies. The forward signal at each successive tap port, ideally, is designed to have the same level at the highest design frequency. This insures a proper forward signal level to each subscriber. It is desirable to selectively control the loss at several points in at least one of the channels of the system. Trunk cables share the same properties, as do generic transmission lines with regard to signal attenuation. But, signals do deteriorate and/or attenuate, for example, as each new tap is added or as an existing tap is removed.

Due to the forward tap design, loss in the return path varies widely with every tap. This causes a corresponding variance in the signal levels in the return path. This variance in signal level imposes severe design constraints on subscriber terminal transmitters (e.g., set-top addressable converters) and adversely affects the ability of headend receivers to properly detect the return path signals. Significant improvements in the return path performance can be achieved by controlling the loss variance in the return path. If the loss at each tap port can be made substantially uniform, the total variance can be brought down to an acceptable level.

As with coaxial amplifiers 6, 7, optical nodes 4 have a provision for adjusting forward and reverse gain levels. The forward slope or tilt of the optical node 4 is adjusted by installing a linear-based equalizer, for example, a JXP-series equalizer, and the forward gain of the optical node 4 is adjusted by installing an attenuator, for example, a JXP-series pad. The forward pads and equalizers are typically installed before the input of the first gain hybrid or at one or more interstage locations that are typically between the gain hybrids.

Like coaxial amplifiers 6, 7, the reverse path signal levels of the optical node 4 are balanced to arrive flat into a reverse optical node station to ensure unity gain from all ports. One common method to balance and adjust the return path is by injecting a pre-established signal level from a Field Service Meter (FSM) at test point 23 of FIG. 7 and at test point 33 of FIG. 8. The balancing signal from the FSM then flows through the upstream amplifiers, through the optical node 4, and then on to the headend 1. The signal level from the FSM is processed at the headend 1 through a specialized headend controller (HEC). The HEC converts the reverse path-balancing signal to a forward path frequency and transmits the information back to the FSM on a dedicated telemetry frequency. The FSM receives the telemetry frequency at test point 23 or test point 33. The specialized channel contains information allowing the technician to adjust for the correct amplitude levels at FIGS. 7 and 8 and install the correct value for the attenuation pads. Reverse equalizers are installed at FIG. 7 in the existing equalizer location but the reverse path cannot be equalized at FIG. 8 because an equalizer location does not exist. This method of unit gain balancing is typically accomplished from the optical node 4 out to the end of the coaxial cable distribution. This ensures that each amplifier in the upstream path has already been balanced correctly, as the technician works toward the end of the line accomplishing the balancing of the forward path and reverse path in one visit. Each amplifier is balanced from the reverse output location to compensate for the tilt developed in the coaxial cable into the next upstream amplifier or optical node. This allows the technician to sweep and balance the forward and return path signals in one visit to each amplifier. The older method of balancing the forward path only and then balancing the reverse path was costly and inefficient. This method of reverse path balancing often-required two technicians, as one technician would measure the incoming signal to the upstream amplifier while the second technician made adjustments on the reverse portion of the downstream amplifier supplying the reverse path signals to the upstream amplifier.

The vast majority or all of optical nodes 4 installed in the U.S. have a location in the output reverse path for an attenuator pad 40 to ensure the flat input levels into the next station upstream, which is accomplished with the installation of the fixed value attenuator/pad at a location for that output reverse path attenuator. However, because the input to the optical node 4 is balanced for flat input levels into the optical node 4 from the downstream amplifier, virtually all optical nodes 4 do not have a location for a reverse equalizer. The performance of the optical link displays a flat response once the input to the optical node transmitter receives a flat input level. This is different from the coaxial cable network, where tilt is developed in the cable transmission. The theory to explain this configuration where there is no equalization in the reverse path of the optical node is that a flat input level to the reverse transmitter 49 in the optical node 2 will deliver a flat output at the optical receiver located in the headend 1. Accordingly, most of the optical nodes 4 installed in the U.S. in recent times do not physically have any location in which a reverse path equalizer can be inserted—in other words, there is no provision for a reverse path equalizer (see, e.g., FIG. 8).

FIG. 10 is a diagrammatic illustration of components at the headend 1. The reverse path signal is received at the headend 1 through an optical receiver 60, which is typically mounted in an equipment rack 61 (which, for example, splits, combines, equalizes, and/or attenuates the signals). The optical signals are converted back to RF and, through coaxial cable 62, supply RF signals to return path equipment (e.g., cable modem termination system (CMTS) 64, VOD 66, set-top box controllers (DAC) 68) inside the headend 1. The cable 62 may span several hundred feet of RG-59 or RG-6 cable. These cables 62 are much smaller in diameter and exhibit more attenuation and tilt-per-foot than the larger, outside, hardline, coaxial cables. Additional coaxial cables 63 are present within the racks 61 to the return path equipment 64, 66, 68 and augment the adverse tilt characteristic. The same tilt characteristics, therefore, occur in the headend cable as described in the outside plant cable, where the coaxial cable exhibits less signal loss at lower frequencies (such as at 5 MHz, for example) than at higher frequencies (42 MHz, for example). Accordingly, the entire communications system requires equalization to arrive flat in the reverse path processing equipment. This equalization of the reverse path signaling has been accomplished at the headend at a very high cost and with very high complexity. In particular, the equalization requires a de-mark location to be installed after the optical receiver 60 inside the headend 1 to process the signals through a separate equalizer circuit, which requires the addition of equipment racks, multiple cables, connectors, and signal management shelves to install the equalizer, which imposes two significantly undesirable costs. First, floor space in each headend is extremely valuable and rare. As such, any requirement for added space is to be avoided. Second, every new rack requires multiple cable terminations, which imparts additional complexity into the system. One commercial example of a headend-resident equalization unit that is costly and requires significant rack space is manufactured by ATX under the trade name MAXNET®.

It would be beneficial to have a system, apparatus, and method to equalize the reverse data signal path to the data network servers from the CATV subscriber where no such equalization presently exists. Adding equalization at the optical node in the reverse path could greatly reduce the reverse path noise contributions often associated with low frequency signal interference. The reverse equalizer has greater attenuation at the unusable lower frequencies from 0 to 12 MHz than at the higher frequencies around 42 MHz (assuming a 42 MHz reverse spectrum). This reduction in the noise can greatly reduce the potential for reverse path laser clipping by reducing the total power input to the laser.

Thus, a need exists to overcome the problems with the prior art systems, designs, and processes as discussed above.

SUMMARY OF THE INVENTION

The systems, apparatuses, and methods described provide a combined equalizer and attenuator for reverse path optical nodes and methods for making and using same that overcome the hereinafore-mentioned disadvantages of the heretofore-known devices and methods of this general type.

A practical and effective approach to equalizing the return path must satisfy several requirements. First, any devices used to equalize the return path must be inexpensive because of the large number of such devices needed to be distributed throughout every one of the optical nodes 4 of the CATV cable system. Second, the devices must be small because such devices need to be deployed within the small confines of an optical node 4, such as the one shown in FIG. 9. In use, the device should be housed in a small housing, be able to install easily, and, if possible, fit within an existing circuit. Third, the device should leave unaffected the forward path response when employing reverse path equalization. The reverse path equalization should be independent of the forward path.

JXP series pads have been used for attenuating both the forward and return paths in optical nodes of a CATV communications system. See, for example, FIG. 9. However, the circuits and physical structures only have room for a single JXP series pad. In other words, there is no physical room in the hundreds of thousands of existing optical nodes to add a slot for a second JXP series equalizer. And, if the JXP series pad is simply replaced with a JXP series equalizer, the result would clip the optical transmitter signal, thereby preventing any return path optical signal from reaching the headend.

A combined pad-and-equalizer, single plug-in can be installed at the input RF flow of the upstream optical transmitter located inside the optical node. The optical node is located in the outside cable plant in most CATV system and connected to the headend through a fiber optic cable. Most optical nodes only have a single input location to install the attenuator pad before the optical upstream transmitter. Combining the pad and equalizer into one plug-in device allows the signals to be pre-equalized before reaching the headend. The equalizer portion of the plug-in supplies pre-equalization to the cable headend processing equipment so that all signals in the return path will arrive at the CMTS and other reverse signal processing equipment at an equal level. The attenuator portion of the single plug-in still is used reduce the overall signal level to match the system design levels required in the headend as originally designed from the optical link.

With the foregoing and other objects in view, there is provided, an optical node assembly for cable television communications comprising at least one optical receiver, at least one optical transmitter having a single first location shaped to receive a first JXP-style component, a router board, a forward configuration board connected to the at least one optical receiver and to the router board, a return configuration board connected to the at least one optical transmitter and to the router board, at least one RF module connected to the at least one optical receiver and to the at least one optical transmitter through the router board and having a forward circuit path and a return circuit path having a single second location shaped to receive a second JXP-style component, and at least one JXP-style component having a circuit comprising both an attenuation sub-circuit and an equalization sub-circuit, the at least one JXP-style component being inserted in at least one of the single first location and the single second location.

With the objects in view, there is also provided an optical node assembly for cable television communications comprising at least one optical receiver, at least one optical transmitter having a single first JXP insert slot shaped to receive a first JXP-style component, a forward configuration board connected to the at least one optical receiver, a return configuration board connected to the at least one optical transmitter, at least one RF module having a forward circuit path connected to the at least one optical receiver and a return circuit path connected to the at least one optical transmitter and having a single second JXP insert slot shaped to receive a second JXP-style component, and at least one JXP-style component having a circuit comprising both an attenuation sub-circuit and an equalization sub-circuit, the at least one JXP-style component being inserted in at least one of the single first JXP insert slot and the single second JXP insert slot.

With the objects in view, there is also provided an optical node assembly for cable television communications comprising at least one optical receiver, at least one optical transmitter having a single first JXP insert slot shaped to receive a first JXP-style component, an RF module having a forward circuit path connected to the at least one optical receiver and a return circuit path connected to the at least one optical transmitter and having a single second JXP insert slot shaped to receive a second JXP-style component, and at least one JXP-style component having a circuit comprising both an attenuation sub-circuit and an equalization sub-circuit, the at least one JXP-style component being inserted in at least one of the single first JXP insert slot and the single second JXP insert slot.

In accordance with another feature, the at least one optical receiver has a single third location shaped to receive a third JXP-style component and the at least one JXP-style component is inserted in at least one of the single first location, the single second location, and the single third location.

In accordance with a further feature, the RF module has two locations in the forward circuit path shaped to receive one of a JXP-style pad and a JXP-style equalizer.

In accordance with an added feature, there are provided a power supply and a power distribution board connected to the power supply, to the at least one RF module, to the at least one optical receiver, and to the at least one optical transmitter.

In accordance with an additional feature, the at least one optical receiver is a plurality of one of one, two, three, four, and five optical receivers, the at least one optical transmitter is a number of optical transmitters equal to the plurality of optical receivers, the at least one RF module is a number of RF modules equal to the plurality of optical receivers, and the at least one JXP-style component is a plurality of JXP-style components respectively inserted into at least one of the single first JXP insert slot and the single second JXP insert slot of each set of one optical receiver, one optical transmitter, and one RF module.

In accordance with yet another feature, the at least one optical receiver is connected to a fiber optic cable through which is received a forward signal, the at least one optical transmitter is connected to the fiber optic cable through which is transmitted a return signal, and the at least one JXP-style component both attenuates and equalizes the return signal.

In accordance with yet a further feature, the at least one JXP-style component is inserted in the single first JXP insert slot.

In accordance with yet an added feature, the at least one JXP-style component is inserted in the single second JXP insert slot.

In accordance with yet an additional feature, the at least one JXP-style component is two JXP-style components each having a circuit comprising both an attenuation sub-circuit and an equalization sub-circuit and respectively inserted in both the single JXP insert slot and the single second JXP insert slot.

In accordance with again another feature, the at least one optical receiver has a single third JXP insert slot shaped to receive a third JXP-style component and the at least one JXP-style component is inserted in at least one of the single first JXP insert slot, the single second JXP insert slot, and the single third JXP insert slot.

In accordance with a concomitant feature, the RF module has two locations in the forward circuit path shaped to receive one of a JXP-style pad and a JXP-style equalizer, and there are provided a power supply and a power distribution board connected to the power supply, to the RF modules, to the at least one optical receiver, and to the at least one optical transmitter.

Although the systems, apparatuses, and methods are illustrated and described herein as embodied in a combined equalizer and attenuator for reverse path optical nodes and methods for making and using same, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which:

FIG. 10 is a diagrammatic illustration of an exemplary embodiment of a prior art headend;

FIG. 11 is a circuit diagram of an exemplary embodiment of a combined equalizer-attenuator;

FIG. 12 is a bottom plan view of an exemplary embodiment of the combined equalizer-attenuator of FIG. 11 in a JXP-style package;

DETAILED DESCRIPTION OF THE EMBODIMENTS

Figure 1:
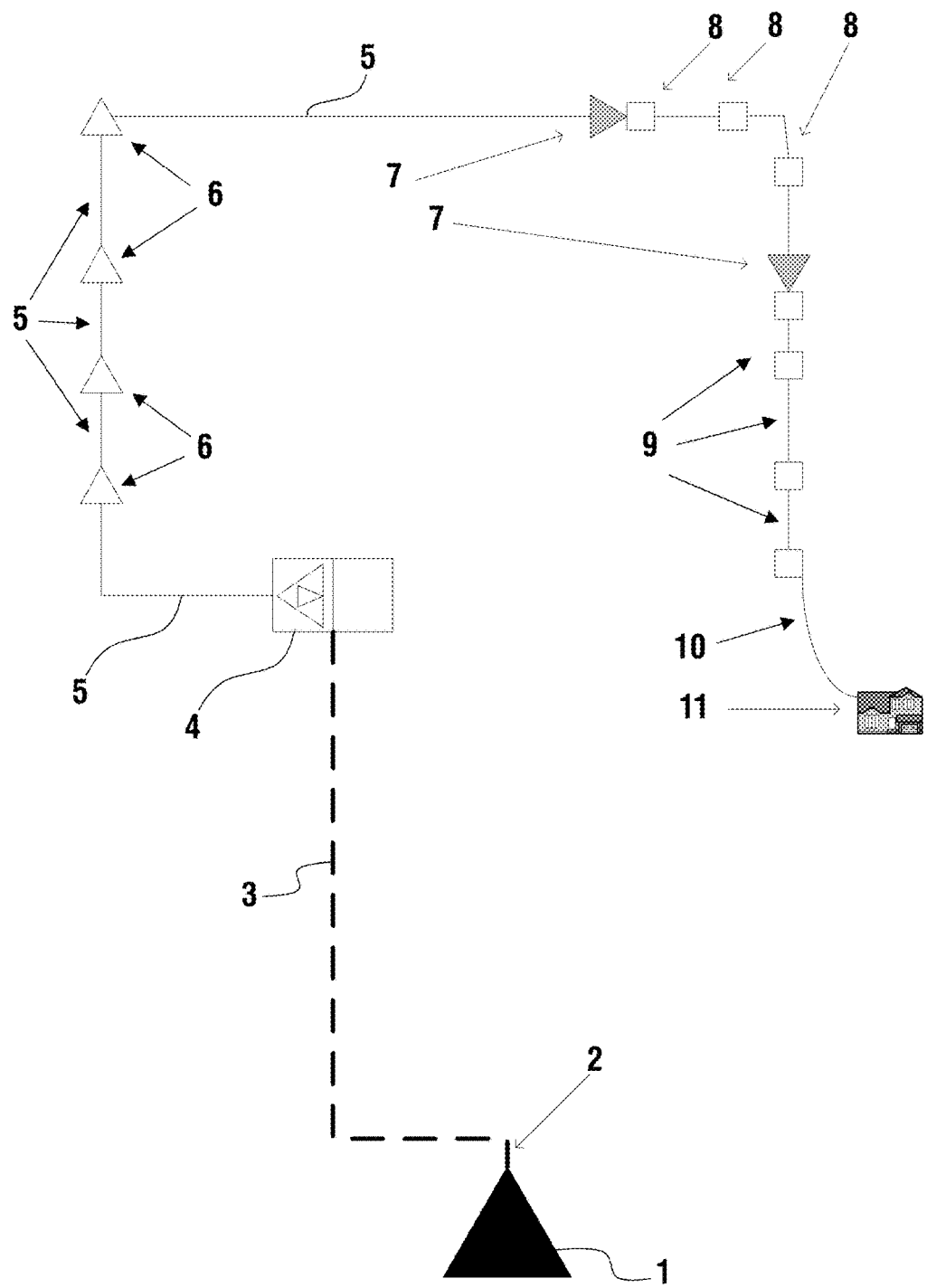
FIG. 1 is a schematic diagram of a prior art coaxial cable based CATV system.
Figure 2:
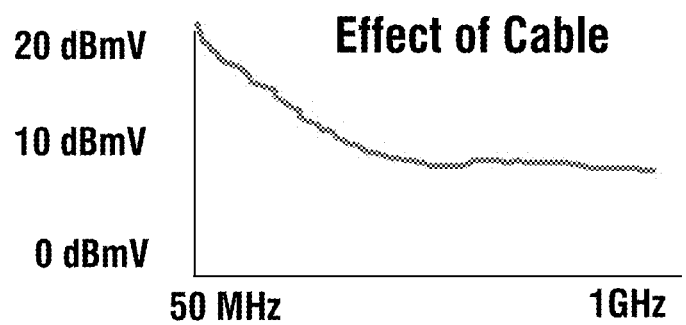
FIG. 2 is a graph of the effect that coaxial cable has on a CATV transmission signal.
Figure 3:
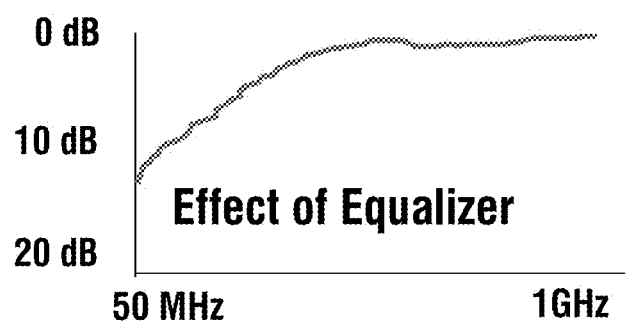
FIG. 3 is a graph of the effect that an equalizer circuit has when installed at a junction of a CATV coaxial transmission cable.
Figure 4:
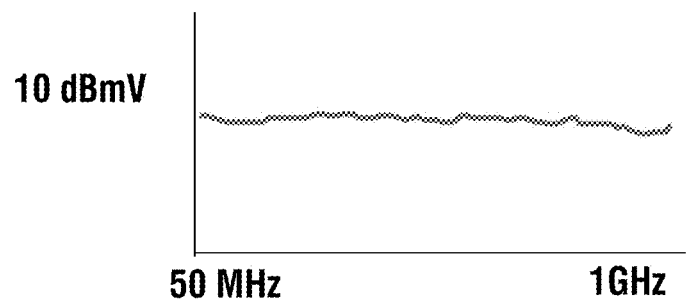
FIG. 4 is a graph of a resultant equalized output signal after the equalizer circuit of FIG. 3 is connected to coaxial cable carrying the signal of FIG. 2.
Figure 5:
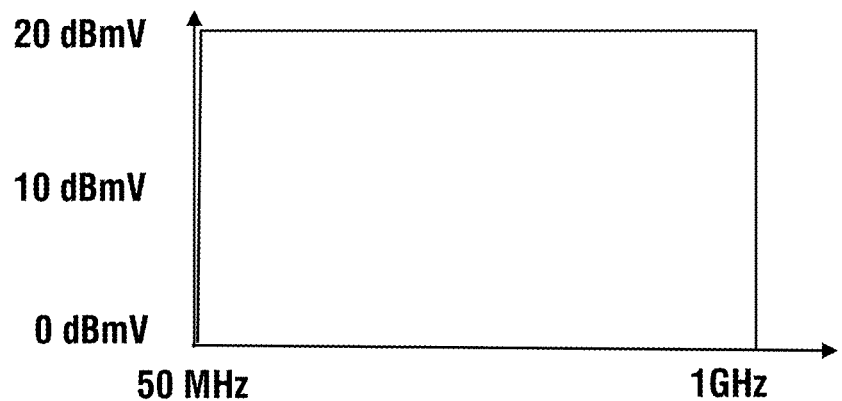
FIG. 5 is a graph of an unattenuated CATV transmission signal.
Figure 6:
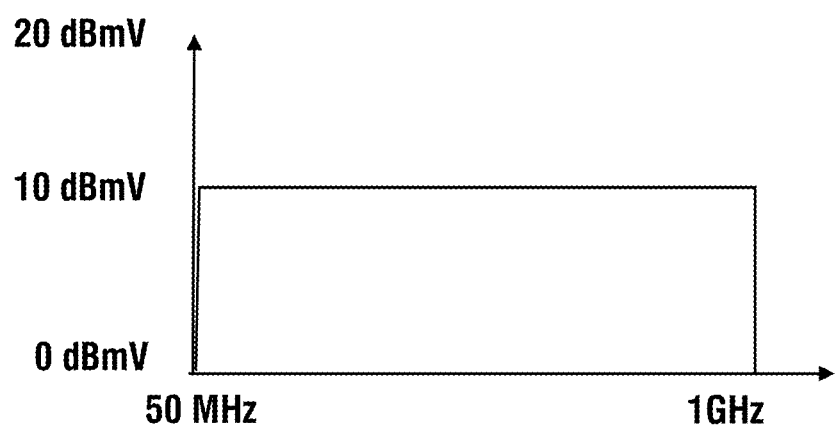
FIG. 6 is a graph of a resultant attenuated output signal after a pad circuit of 10 dB is connected to coaxial cable carrying the signal of FIG. 5.
Figure 7:
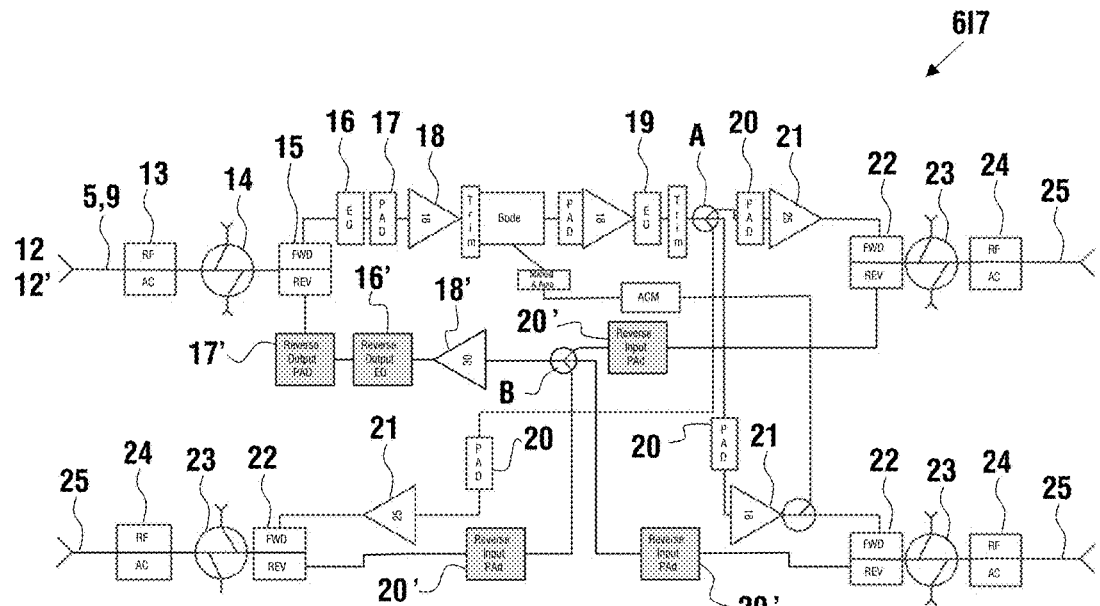
FIG. 7 is a schematic circuit diagram of a prior art standard CATV amplifier with application of equalization and attenuation.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIG. 11, there is shown a first exemplary embodiment of circuit 102 for an integrated, plug-in, attenuator-and-equalizer device 100 (also referred to herein as "Eq-Pad") that can be deployed and installed in the optical node 4 in existing, reverse-path, attenuator pad locations within an existing optical node 4. The Eq-Pad circuit 102 includes multiple fixed resistors and inductors for the attenuation sub-circuit 110 and multiple fixed resistors, inductors, and capacitors in the equalization sub-circuit 120 to establish different levels of equalization across the desired bandwidth. The dB values of the attenuation sub-circuit 110 are selected to produce any value for attenuation. An exemplary set of values can start at 1 dB and end at 20 dB in increments of 1 dB. Values for half of a dB are also possible. The dB values of the equalization sub-circuit 120 are selected to produce any value for equalization. An exemplary set of values can start at 1 dB and end at 12 dB in increments of 1 dB. Values for half of a dB are also possible.

Figure 15:
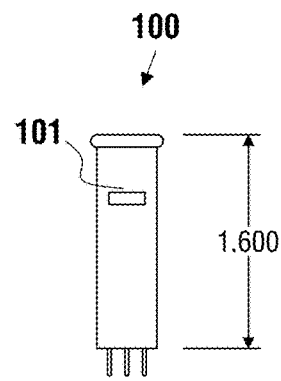
FIG. 15 is a side elevational view of the combined equalizer-attenuator of FIG. 12 in a 1.6-inch JXP-style package.
Figure 16:
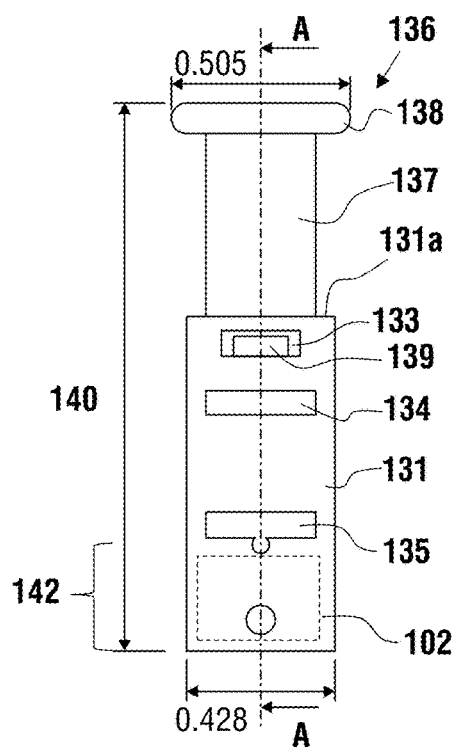
FIG. 16 is a front elevational view of an exemplary embodiment of a combined equalizer-attenuator with a length-adjusting plunger assembly in a fully extended or expanded position.
Figure 17:
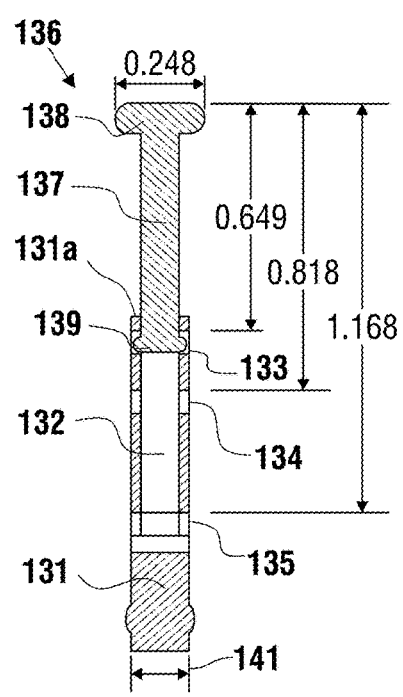
FIG. 17 is a cross-sectional view of the combined equalizer-attenuator of FIG. 16 along section line A-A.

When installed, the Eq-Pad 100 replaces a reverse-path pad 40 of the optical node (which simply attenuates communications signals from 0 to 42 MHz, as an example) to provide both the attenuation (e.g., of 0 to 42 MHz) and equalization of those signals on the same plug-in device. Because the attenuator pads in most optical nodes 4 have a standardized format that is molded for protection of the component circuitry, the Eq-Pad 100 is configured physically to match a standard pad format. In the exemplary embodiment of FIG. 11, the standard format is the JXP form. As shown in FIGS. 12 through 15, the Eq-Pad 100 in the JPX-style package can be in the form of a 1.0-inch JXP (FIG. 13), a 1.4-inch JXP (FIG. 14), or a 1.6-inch JXP (FIG. 15). As desired, the 1.4-inch and 1.6-inch JXP packages can have breakaway upper portions 101 that, when broken away, convert the 1.4-inch and 1.6-inch JXP packages into a 1-inch JXP package that no longer has an upper T-top handle.

In an alternative to the breakaway form (shown, e.g., in FIGS. 14 and 15), an adjustable Eq-Pad 130 in the JXP-style package can be provided. Instead of a fixed, molded encapsulation, the Eq-Pad 130 has a main body 131 defining an interior cavity 132 that is open to the environment at a top surface 131a of the main body 131. The main body 131 also defines sets of lateral ports 133, 134, 135 at distances along the interior cavity 132. In this exemplary embodiment, the lateral ports 133, 134, 135 are each a pair of ports 133, 134, 135 opposite one another along the longitudinal extent of the main body 131 and passing entirely through to the environment on the front and rear sides thereof. However, in an alternative embodiment, the ports 133, 134, 135 can be only a single port at the three longitudinal distances. In another alternative embodiment, the ports 133, 134, 135 need not pass entirely through the main body 131 from the interior cavity 132 to the exterior; in other words, the ports 133, 134, 135 can be blind holes within the interior cavity 132 extending towards the front and rear surfaces but not all the way through.

An adjustable plunger 136 is shaped to be inserted movably within the interior cavity 132. The plunger 136 has a plunger body 137 extending from a head 138 to a distal end at which are, in this exemplary embodiment, two opposing bosses 139 extending away from the front and back surfaces of the plunger body 137 to create a widening. This widening produces a shape that creates a form-fit between the bosses 139 and each of the ports 133, 134, 135 and, when aligned, produces a form-locking connection that resists further longitudinal movement of the plunger 136 into or out from the interior cavity 132. A form-locking or form-fitting connection is one that connects two elements together due to the shape of the elements themselves, as opposed to a force-locking connection, which locks the elements together by force external to the elements. In an alternative embodiment, there can be only one boss 139.

Figures 18, 19:
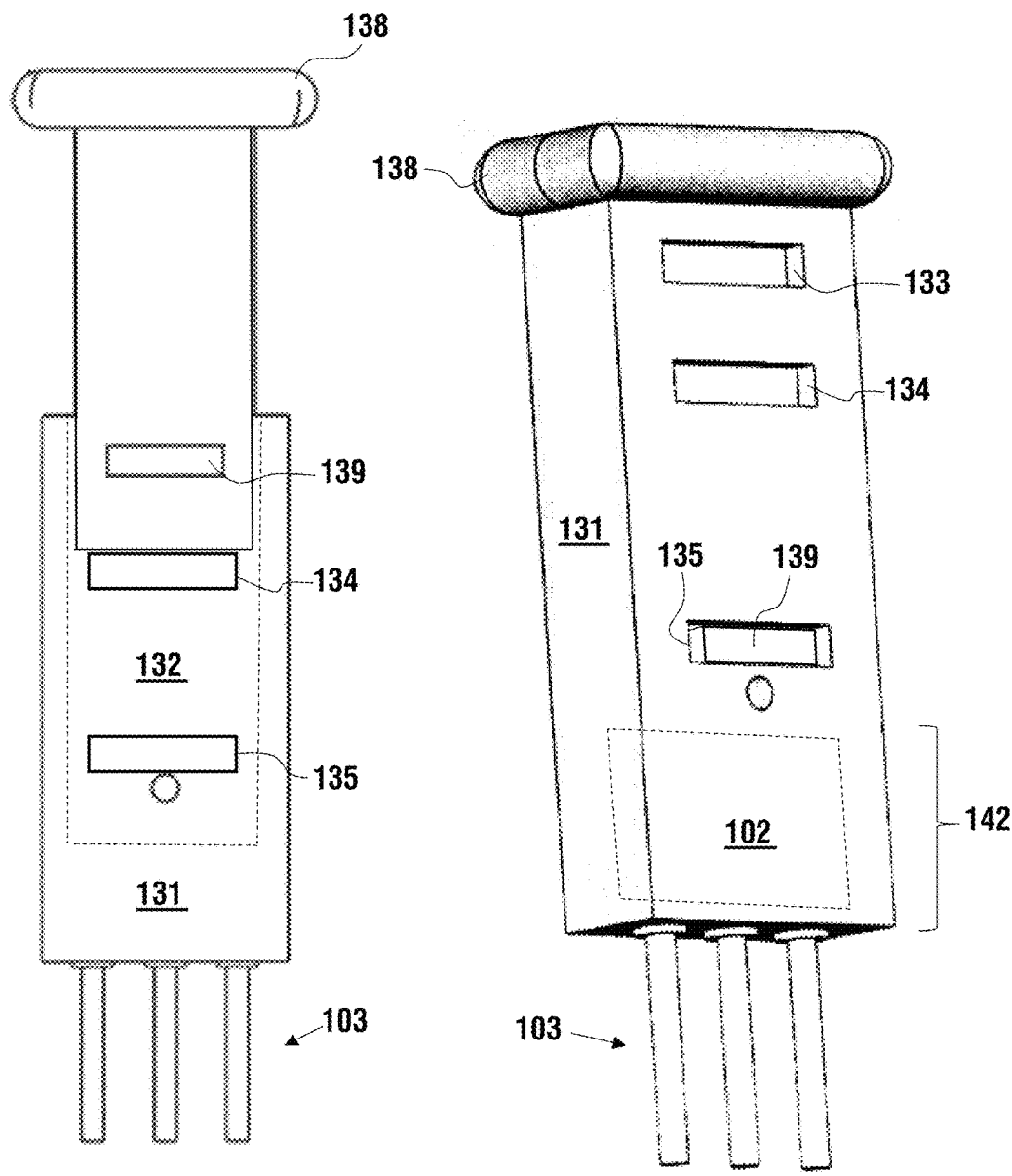
FIG. 18 is a partially front elevational view and partially cross-sectional view of the combined equalizer-attenuator of FIG. 16.
FIG. 19 is a perspective view of the combined equalizer-attenuator of FIG. 16 in a fully compressed or contracted position.
Figure 20:
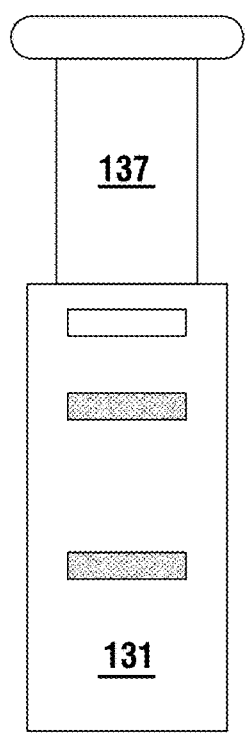
FIG. 20 is a photograph of a front perspective view of the combined equalizer-attenuator of FIG. 16 in a fully extended or expanded position.
Figure 21:
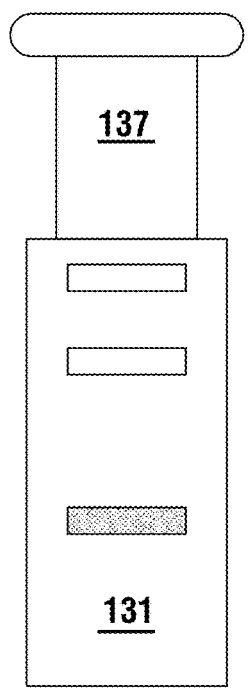
FIG. 21 is a photograph of a front perspective view of the combined equalizer-attenuator of FIG. 16 in an intermediate position.
Figure 22:
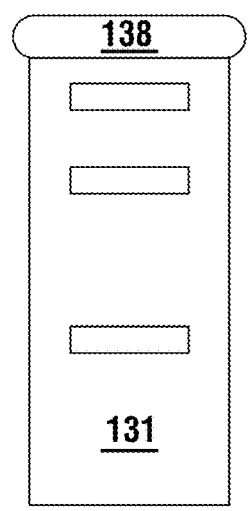
FIG. 22 is a photograph of a front perspective view of the combined equalizer-attenuator of FIG. 16 in a fully compressed or contracted position.

The length of the plunger 136 and the location of the ports 133, 134, 135 are selected to create a JXP package having a total longitudinal length 140 that can adjust between three values, approximately 1.0" when the bosses are present in port 135 (see, e.g., FIG. 22), approximately 1.4" when the bosses are present in port 134 (see, e.g., FIG. 21), and approximately 1.6" when the bosses are present in port 133 (see, e.g., FIG. 20). FIG. 18 illustrates the approximately 1.6" configuration where the bosses 139 are aligned with uppermost port 133 (not illustrated) and FIG. 19 illustrates the approximately 1.0" configuration where the bosses 139 are aligned with lowermost port 135.

Because the shape of the interior cavity 132 takes up most of the front-to-back width 141 of the main body 131 in this exemplary embodiment, the Eq-Pad circuit 102 is located in a lowermost portion 142 of the main body 131. The Eq-Pad circuit 102 is illustrated, for example, with dashed lines in FIGS. 16 and 19. Not illustrated in FIGS. 16, 17, and 20 to 22 are the three conductive pins 103 shown, for example, in FIGS. 12 through 15, 18, and 19.

Equalizers for optical nodes 4 are typically provided in twelve 1 dBmV increments, starting from one (1) dBmV and ending at twelve (12) dBmV. Attenuators for optical nodes 4 are typically provided in twenty 1 dBmV increments, starting from one (1) dBmV and ending at twenty (20) dBmV. One Eq-Pad 100 provides a fixed value for equalization and a fixed value for attenuation. Accordingly, the Eq-Pad 100 can be provided in a set of as many different values as desired, some of which are shown in the following chart.

| Equalization (dB) | Attenuation (dB) | Equalization (dB) | Attenuation (dB) | ... | Equalization (dB) | Attenuation (dB) |
|---|---|---|---|---|---|---|
| 1 | 1 | 2 | 1 | ... | 12 | 1 |
| 1 | 2 | 2 | 2 | ... | 12 | 2 |
| 1 | 3 | 2 | 3 | ... | 12 | 3 |
| 1 | 4 | 2 | 4 | ... | 12 | 4 |
| 1 | 5 | 2 | 5 | ... | 12 | 5 |
| 1 | 6 | 2 | 6 | ... | 12 | 6 |
| 1 | 7 | 2 | 7 | ... | 12 | 7 |
| 1 | 8 | 2 | 8 | ... | 12 | 8 |
| 1 | 9 | 2 | 9 | ... | 12 | 9 |
| 1 | 10 | 2 | 10 | ... | 12 | 10 |
| 1 | 11 | 2 | 11 | ... | 12 | 11 |
| 1 | 12 | 2 | 12 | ... | 12 | 12 |
| 1 | 13 | 2 | 13 | ... | 12 | 13 |
| 1 | 14 | 2 | 14 | ... | 12 | 14 |
| 1 | 15 | 2 | 15 | ... | 12 | 15 |
| 1 | 16 | 2 | 16 | ... | 12 | 16 |
| 1 | 17 | 2 | 17 | ... | 12 | 17 |
| 1 | 18 | 2 | 18 | ... | 12 | 18 |
| 1 | 19 | 2 | 19 | ... | 12 | 19 |
| 1 | 20 | 2 | 20 | ... | 12 | 20 |

The combined Eq-Pad 100 can be installed in the optical node 4 to accomplish the same equalization within the headend 1, the latter of which is complicated and very expensive to install and maintain. The single plugin Eq-Pad 100 improves reliability of the system because it reduces the additional multiple points of failure associated with the connectors, the cables, and the passive equipment installed at the headend 1. The integrated attenuator-and-equalizer device 100 also helps improve overall performance of the optical node 4. Some optical nodes 4 introduce an undesired tilt into the return path signal. The addition of an equalization network with the Eq-Pad 100 can greatly reduce the undesired tilt before the electrical RF signals are converted to an optical signal for transmission over the optical cable to the equipment at the headend 1. The equalizer portion of the Eq-Pad 100 can also reduce the total combined noise into the optical laser to reduce laser clipping. The majority of unwanted ingress in the return path occurs from approximately 5 MHz to approximately 15 MHz. An equalizer exhibits the greatest amount of attenuation at these frequencies and, therefore, can greatly reduce the overall power at these frequencies to improve the signal-to-noise ratio as well as reduce the amplitude of these unwanted signals while passing the usable frequencies with minimal attenuation.

The operator simply chooses one of the various different values to deliver the best/optimal noise and performance contributions.

Figure 8:
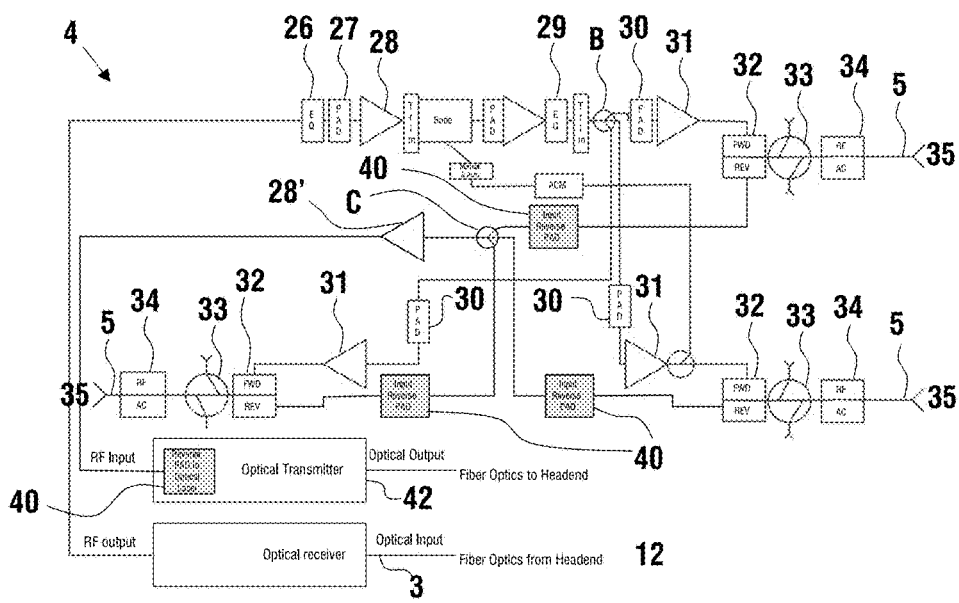
FIG. 8 is a schematic circuit diagram of a prior art standard CATV optical communications node for broadband communications.
Figure 9:
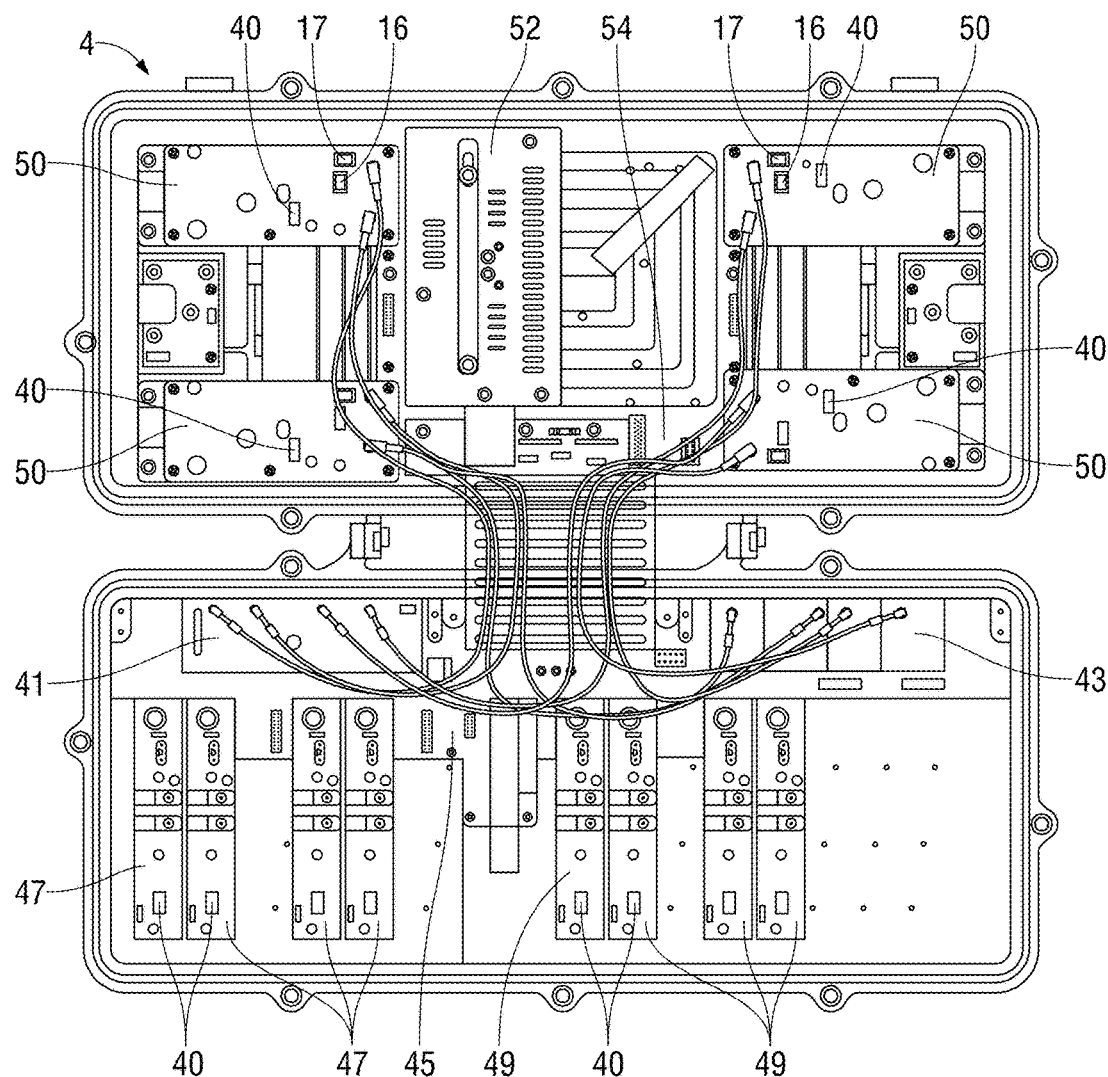
FIG. 9 is a photograph of a prior art standard optical CATV communications node.
Figure 13:
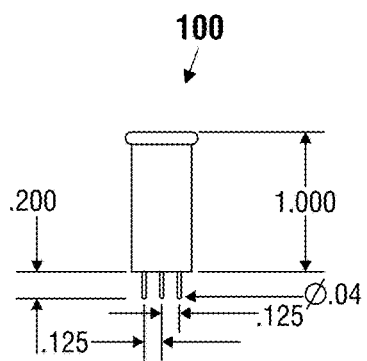
FIG. 13 is a side elevational view of the combined equalizer-attenuator of FIG. 12 in a 1-inch JXP-style package.
Figure 14:
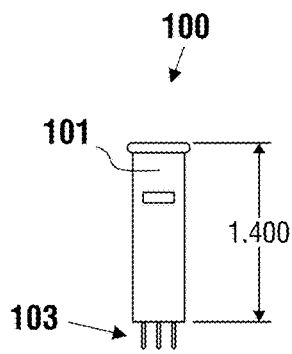
FIG. 14 is a side elevational view of the combined equalizer-attenuator of FIG. 12 in a 1.4-inch JXP-style package.

The integrated Eq-Pad 100 can be installed (as shown in FIG. 8) either at the input attenuator location 40 at each optical node 4 before the reverse signals are combined or at the input pad location 40 to the optical reverse laser, or at both, as desired or needed.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. An optical node assembly for cable television communications, comprising:
   at least one optical receiver;
   at least one optical transmitter having a single first location shaped to receive a first JXP-style component;
   a router board;
   a forward configuration board connected to the at least one optical receiver and to the router board;
   a return configuration board connected to the at least one optical transmitter and to the router board;
   at least one RF module connected to the at least one optical receiver and to the at least one optical transmitter through the router board and having:
      a forward circuit path; and
      a return circuit path having a single second location shaped to receive a second JXP-style component; and
   at least one JXP-style component having a circuit comprising both an attenuation sub-circuit and an equalization sub-circuit, the at least one JXP-style component being inserted in at least one of the single first location and the single second location.

2. The assembly according to claim 1, wherein:
   the at least one optical receiver has a single third location shaped to receive a third JXP-style component; and
   the at least one JXP-style component is inserted in at least one of the single first location, the single second location, and the single third location.

3. The assembly according to claim 1, wherein the at least one RF module has two locations in the forward circuit path shaped to receive one of a JXP-style pad and a JXP-style equalizer.

4. The assembly according to claim 1, further comprising a power supply and a power distribution board connected to the power supply, to the at least one RF module, to the at least one optical receiver, and to the at least one optical transmitter.

5. The assembly according to claim 1, wherein:
   the at least one optical receiver is a plurality of one of one, two, three, four, and five optical receivers;
   the at least one optical transmitter is a number of optical transmitters equal to the plurality of optical receivers;
   the at least one RF module is a number of RF modules equal to the plurality of optical receivers; and
   the at least one JXP-style component is a plurality of JXP-style components respectively inserted into at least one of the single first location and the single second location of each set of one optical receiver, one optical transmitter, and one RF module.

6. The assembly according to claim 1, wherein:
   the at least one optical receiver is connected to a fiber optic cable through which is received a forward signal;
   the at least one optical transmitter is connected to the fiber optic cable through which is transmitted a return signal; and
   the at least one JXP-style component both attenuates and equalizes the return signal.

7. An optical node assembly for cable television communications, comprising:
   at least one optical receiver;
   at least one optical transmitter having a single first JXP insert slot shaped to receive a first JXP-style component;
   a forward configuration board connected to the at least one optical receiver;
   a return configuration board connected to the at least one optical transmitter;
   at least one RF module having:
      a forward circuit path connected to the at least one optical receiver; and
      a return circuit path connected to the at least one optical transmitter and having a single second JXP insert slot shaped to receive a second JXP-style component; and
   at least one JXP-style component having a circuit comprising both an attenuation sub-circuit and an equalization sub-circuit, the at least one JXP-style component being inserted in at least one of the single first JXP insert slot and the single second JXP insert slot.

8. The assembly according to claim 7, wherein the at least one JXP-style component is inserted in the single first JXP insert slot.

9. The assembly according to claim 7, wherein the at least one JXP-style component is inserted in the single second JXP insert slot.

10. The assembly according to claim 7, wherein the at least one JXP-style component is two JXP-style components each having the circuit comprising both the attenuation sub-circuit and the equalization sub-circuit and respectively inserted in both the single first JXP insert slot and the single second JXP insert slot.

11. The assembly according to claim 7, wherein:
the at least one optical receiver has a single third JXP insert slot shaped to receive a third JXP-style component; and
the at least one JXP-style component is inserted in at least one of the single first JXP insert slot, the single second JXP insert slot, and the single third JXP insert slot.

12. The assembly according to claim 7, wherein the at least one RF module has two locations in the forward circuit path shaped to receive one of a JXP-style pad and a JXP-style equalizer, and further comprising a power supply and a power distribution board connected to the power supply, to the at least one RF module, to the at least one optical receiver, and to the at least one optical transmitter.

13. The assembly according to claim 7, wherein the at least one RF module has two locations in the forward circuit path shaped to receive one of a JXP-style pad and a JXP-style equalizer.

14. The assembly according to claim 7, wherein:
the at least one optical receiver is a plurality of one of one, two, three, four, and five optical receivers;
the at least one optical transmitter is a number of optical transmitters equal to the plurality of optical receivers;
the at least one RF module is a number of RF modules equal to the plurality of optical receivers; and
the at least one JXP-style component is a plurality of JXP-style components respectively inserted into at least one of the single first JXP insert slot and the single second JXP insert slot of each set of one optical receiver, one optical transmitter, and one RF module.

15. The assembly according to claim 7, wherein:
the at least one optical receiver is connected to a fiber optic cable through which is received a forward signal;
the at least one optical transmitter is connected to the fiber optic cable through which is transmitted a return signal; and
the at least one JXP-style component both attenuates and equalizes the return signal.

16. An optical node assembly for cable television communications, comprising:
at least one optical receiver;
at least one optical transmitter having a single first JXP insert slot shaped to receive a first JXP-style component;
at least one RF module having:
a forward circuit path connected to the at least one optical receiver; and
a return circuit path connected to the at least one optical transmitter and having a single second JXP insert slot shaped to receive a second JXP-style component; and
at least one JXP-style component having a circuit comprising both an attenuation sub-circuit and an equalization sub-circuit, the at least one JXP-style component being inserted in at least one of the single first JXP insert slot and the single second JXP insert slot.

17. The assembly according to claim 16, wherein the at least one JXP-style component is two JXP-style components each having the circuit comprising both the attenuation sub-circuit and the equalization sub-circuit and respectively inserted in both the single first JXP insert slot and the single second JXP insert slot.

18. The assembly according to claim 16, wherein:
the at least one optical receiver has a single third JXP insert slot shaped to receive a third JXP-style component; and
the at least one JXP-style component is inserted in at least one of the single first JXP insert slot, the single second JXP insert slot, and the single third JXP insert slot.

19. The assembly according to claim 16, wherein:
the at least one optical receiver is a plurality of one of one, two, three, four, and five optical receivers;
the at least one optical transmitter is a number of optical transmitters equal to the plurality of optical receivers;
the at least one RF module is a number of RF modules equal to the plurality of optical receivers; and
the at least one JXP-style component is a plurality of JXP-style components respectively inserted into at least one of the single first JXP insert slot and the single second JXP insert slot of each set of one optical receiver, one optical transmitter, and one RF module.

20. The assembly according to claim 16, wherein:
the at least one optical receiver is connected to a fiber optic cable through which is received a forward signal;
the at least one optical transmitter is connected to the fiber optic cable through which is transmitted a return signal; and
the at least one JXP-style component both attenuates and equalizes the return signal.

\* \* \* \* \*